Figure 1:
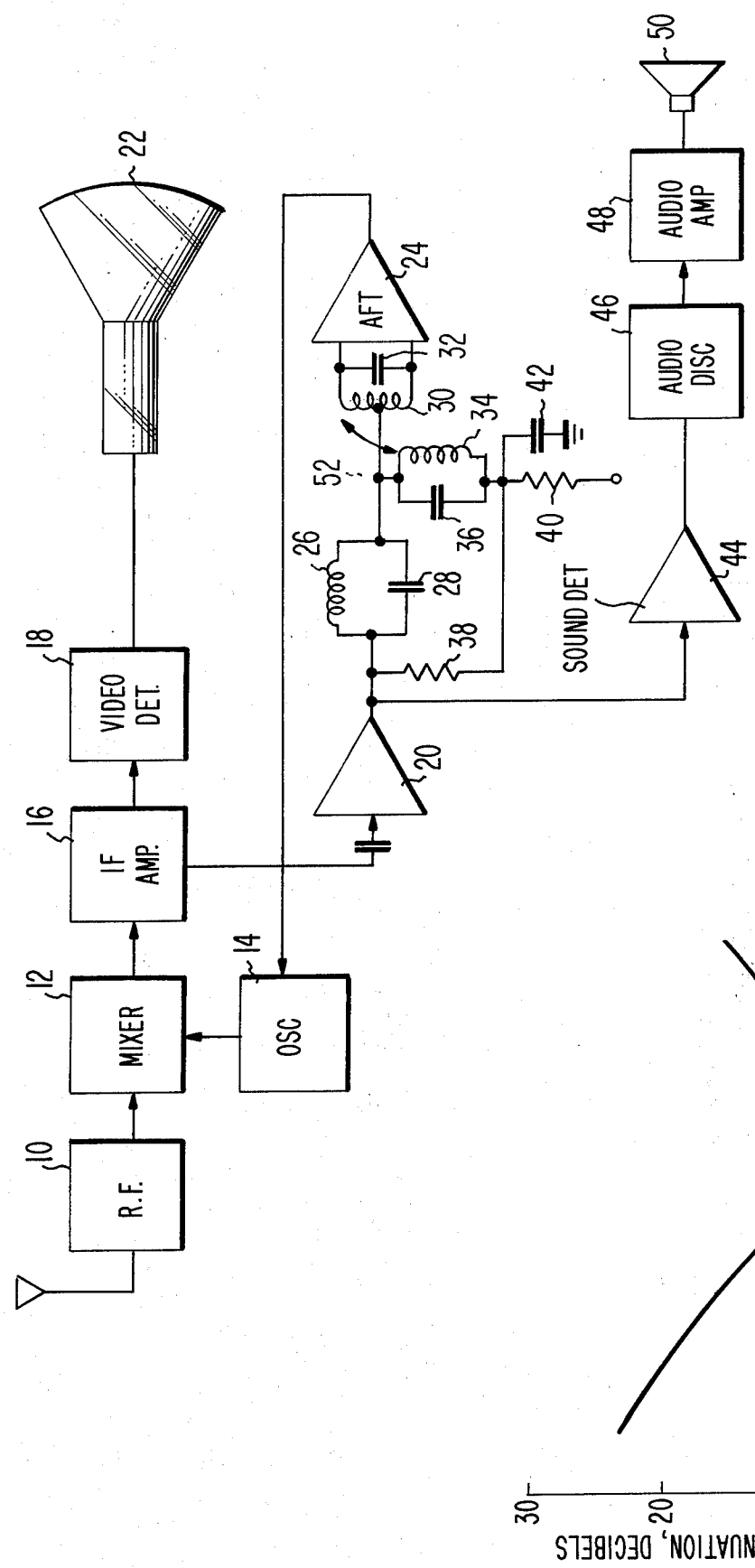

United States Patent [19]
Muterspaugh

[11] 3,970,773
[45] July 20, 1976

[54] FREQUENCY SELECTIVE CIRCUIT FOR AUTOMATIC FREQUENCY CONTROL AND SOUND SIGNALS

[75] Inventor: Max Ward Muterspaugh, Indianapolis, Ind.

[73] Assignee: RCA Corporation, New York, N.Y.

[22] Filed: Aug. 18, 1975

[21] Appl. No.: 605,592

[52] U.S. Cl. .......................... 178/5.8 R; 178/5.8 A; 178/5.8 AF
[51] Int. Cl.² ...................... H04N 5/44; H04N 5/62
[58] Field of Search.......... 178/5.8 R, 5.8 A, 5.8 AF Primary Examiner—Robert L. Richardson
Attorney, Agent, or Firm—E. M. Whitacre; P. M. Emanuel

[57] ABSTRACT

An intercarrier television receiver incorporates circuitry for providing automatic fine tuning signals and frequency translated sound carrier signals. A series-shunt resonant circuit arrangement modifies the passband response of signals provided by an intercarrier IF amplifier and generates both a desired sound carrier to picture carrier relationship and a desired automatic fine tuning response.

6 Claims, 5 Drawing Figures

FREQUENCY SELECTIVE CIRCUIT FOR AUTOMATIC FREQUENCY CONTROL AND SOUND SIGNALS

This invention relates to television circuitry, and more particularly to apparatus for providing automatic frequency control signals and frequency translated sound signals for an intercarrier sound system.

In the intercarrier sound systems currently employed in television receivers, an intermediate frequency (IF) amplifier amplifies both a modulated sound carrier and a modulated picture carrier. The frequency separation of these respective carrier signals is arranged according to particular broadcast standards (e.g., in the United States, the separation is 4.5 megahertz). The combined signal which is amplified by the IF amplifier is supplied to tuned filter networks which, in turn are coupled to appropriate detector stages for detecting picture and sound portions of the signal. It is desirable that the sound carrier be significantly attenuated relative to the picture carrier prior to the video detector stage but, at the same time, to provide an appropriate quality of sound output, the sound carrier supplied to the sound detector should be relatively less attenuated.

In addition, in color television receivers (and some deluxe monochrome receivers), it is customary to provide automatic frequency control (or "automatic fine tuning") circuits to maintain the included tuners locked to appropriate operating frequencies. Such automatic frequency control circuits generally include a relatively narrow band tuned circuit for sensing the intermediate frequency picture carrier component (e.g., nominally at 45.75 MHz under U.S. broadcast standards) for controlling the tuner.

The invention described herein achieves both a desirable automatic fine tuning (AFT) response and a desired sound carrier response with relatively simple circuitry. To provide such sound and AFT response, an amplifier means is coupled to the intermediate frequency amplifier of the television receiver for receiving both the modulated sound carrier and modulated picture carrier signals. A discriminator means including a first resonant circuit having a resonance at a frequency substantially equal to said picture carrier frequency is receptive to signals provided by said amplifier means for providing automatic fine tuning signals responsive to picture carrier frequency deviation from this resonant frequency. A second resonant circuit is interposed in series between the amplifier means and the discriminator means and provides a resonance at a frequency lower than the sound carrier frequency. The second resonant circuit provides a load upon the output of the amplifier means causing this amplifier to provide a greater amount of amplification for frequencies close to the resonance of the second resonant circuit than for frequencies far removed from resonance.

A better understanding of this invention may be derived with reference to the following description and the drawings of which:

FIG. 1 illustrates a partial block and schematic diagram of an intercarrier television receiver incorporating the present invention; and FIGS. 2A–2D represent passband characteristics of portions of the apparatus of FIG. 1.

Referring to FIG. 1, signals received by a television receiver antenna are processed through an RF amplifier 10 which couples signals to a mixer 12. Mixer 12 receives heterodyning signals fom a local oscillator 14 and provides signals translated to intermediate frequencies to an IF amplifier 16. Amplifier 16 provides intermediate frequency signals to a video detector 18 and to a broadband amplifier 20 suitable for passing signals extending from chrominance signal components to sound signal components. Signals provided by video detector 18 are processed in appropriate circuitry (such as that shown in RCA Service Data 1974 No. C-5 for a CTC-68 type receiver, published by RCA Corporation, Indianapolis, Indiana) for coupling to a kinescope 22.

Signals processed by broadband amplifier 20 are coupled via a parallel resonant circuit comprising an inductor 26 and a capacitor 28 to an AFT amplifier detector 24 which includes a center-tapped secondary transformer winding 30 and a tuning capacitor 32. A shunt resonant circuit 52 comprising a transformer primary 34 and a capacitor 36 is also coupled to transformer winding 30.

A beat frequency or mixing amplifier 44 is coupled to an output terminal of amplifier 20 and provides frequency translated sound carrier signals to sound detector or discriminator 46. Discriminator 46 demodulates the sound carrier signals and provides audio signals to an amplifier 48 which in turn couples these signals to a loudspeaker 50.

A load resistor 38 is further coupled to the output terminal of amplifier 20 and to a source of operating voltage (B+) through a resistor 40. A bypass capacitor 42 is coupled to the common junction of resistors 38 and 40.

In the operation of the above-described circuitry, IF amplifier 1 is arranged to provide sufficient bandwidth to pass both picture and sound information. In the United States, the IF picture carrier is located nominally at 45.75 megahertz and the IF sound carrier is located nominally at 41.25 megahertz. The passband of IF amplifier 16 is shaped by means of additional tuned circuits (not shown) following mixer 12 such as to provide a relatively high rate of attenuation to signals lower than about 41.25 megahertz and higher than about 48 megahertz. In the case where the receiver is adapted for color signal reception, the shape of the passband is adjusted to provide proper amplification of picture, chrominance and sound carrier signals.

Under adverse reception conditions, it may be desirable to tune the receiver such that the picture carrier is displaced from the nominal passband position of 45.75 MHz, which is somewhat below the peak amplitude response of the IF amplifier 16, in order to receive a more usable picture signal. If, for example, the television tuner is mis-fine-tuned such that the IF picture carrier frequency and the IF sound carrier frequency are each shifted lower in frequency than the nominal values, the picture carrier information will be enhanced in amplitude but the sound carrier information may be unduly attenuated by the IF passband response. To remedy this particular problem, a sound response is provided which, in combination with the IF passband response, produces a modified response having a low frequency region in which the sound carrier has a smaller amount of attenuation at decreased frequencies. The parallel combination of inductor 26 and capacitor 28 is adjusted to provide a parallel resonance at a frequency below the nominal IF sound subcarrier, i.e., at about 37 megahertz. The resonant circuit 26, 28 thus provides a relatively high impedance at the output of amplifier 20 at the resonant frequency and a relatively low impedance at other frequencies. As a result, IF signals passing through amplifier 20 are subject to relatively high impedance loading at frequencies near the resonance and relatively low impedance loading at frequencies away from resonance. By varying the output loading of amplifier 20 as a function of signal frequency, the signal gain provided by this amplifier is caused to similarly vary. For example, signals provided at the output terminal of amplifier 20 are amplified relatively more for input signals of 37 megahertz than for 41 megahertz. A frequency response curve showing the relative output signal amplitude (i.e., gain) of amplifier 20 is illustrated in FIG. 2B. When the amplifier 20 is mated with the IF amplifier 16, a composite response is generated. This composite response is represented by the addition of the decibel curve of FIG. 2B with the IF response curve shown in FIG. 2A. The resultant addition of these two curves is illustrated in FIG. 2C. With reference to FIG. 2C, it may be seen that the sound carrier, located at 41.25 megahertz, has an attenuation of about 12 db, while the picture carrier response (45.75 MHz) is substantially at 0 db. This compares with the attenuation of the sound carrier shown on the curve in FIG. 2A of 18 db relative to a 2.5 db attenuation of the picture carrier. As fine tuning of the television receiver is adjusted to shift the sound carrier signal lower in frequency to, for example, 41 megahertz, the attenuation of the sound carrier as measured at the IF amplifier is about 22.5 db, while that as seen in FIG. 2C is at about 15 db. At the same time, the picture carrier is enhanced in the response of FIG. 2C to approximately 1.5 db attenuation but drops to 1 db attenuation in FIG. 2C. Hence, the response derived from FIG. 2C shows a more gradually diminished relative attenuation of the sound carrier with diminished frequency as compared to that measured from the IF curve of FIG. 2A. It will be further noted that the amplitude of the sound carrier as measured at the output of amplifier 20 (FIG. 2C) is not as greatly diminished at that provided from the IF amplifier 16. In cases of extreme mis-fine-tuning as, for example, when the sound carrier is shifted more than 1 mgahertz lower in frequency to, for example, 40 megahertz, it will be appreciated that the attenuation of the sound carrier as measured at the output of amplifier 20 is only 29.5 db, while that provided at the IF is about 41.5 db. Mis-fine-tuning of this extreme may be utilized in fringe areas of reception where the signal energy received by the television receiver is extremely weak. Some exaggerated mis-fine-tuning may be required in order to provide a usable picture.

In a further aspect of the apparatus of FIG. 1, an automatic fine tuning signal is developed at the output of amplifier 24. An AFT response is generated by providing a relatively high Q tuned circuit centered about the picture carrier frequency which is coupled to a discriminator circuit having a response which varies as a function of frequency deviation from the picture carrier frequency. At the picture carrier frequency (45.75 megahertz), the tuned circuit comprised of inductor 26 and capacitor 28 is relatively far from its point of resonance. In this frequency region, signals provided from amplifier 20 are primarily coupled through the low impedance of capacitor 28 to the AFT circuitry. A transformer comprised of primary inductor 34 and secondary inductor 30 is arranged to have a primary circuit resonant with capacitor 36 approximately at the picture carrier frequency; i.e., 45.75 megahertz. A resonant response in this frequency region creates a very high impedance to the signals provided directly to the center tap of inductor 30 and further provides a peaked energy transfer from inductor 34 to secondary inductor 30. As a result of the resonant response of the primary (34), a narrow band high Q response results at circuit point 52 (see FIG. 1). A frequency response curve illustrating the signal level at point 52 with reference to input of amplifier 20 is illustrated in FIG. 2D.

Figure 2D:
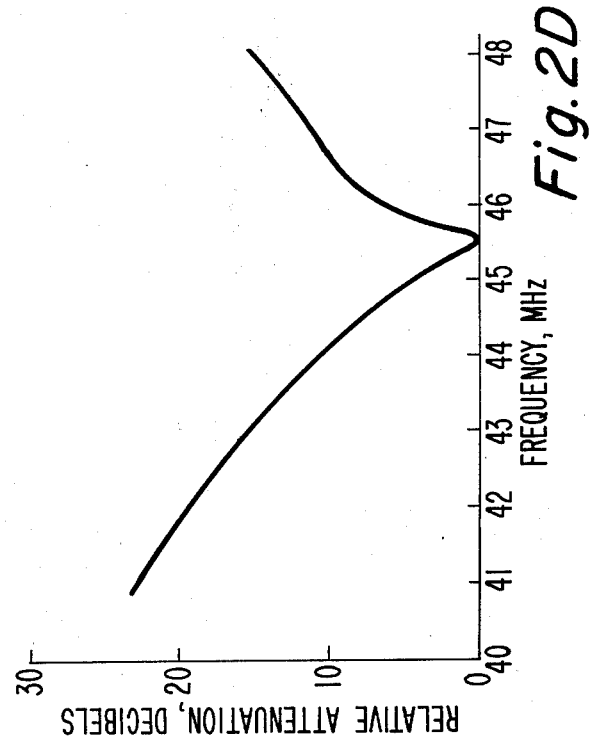
Figure 2A:
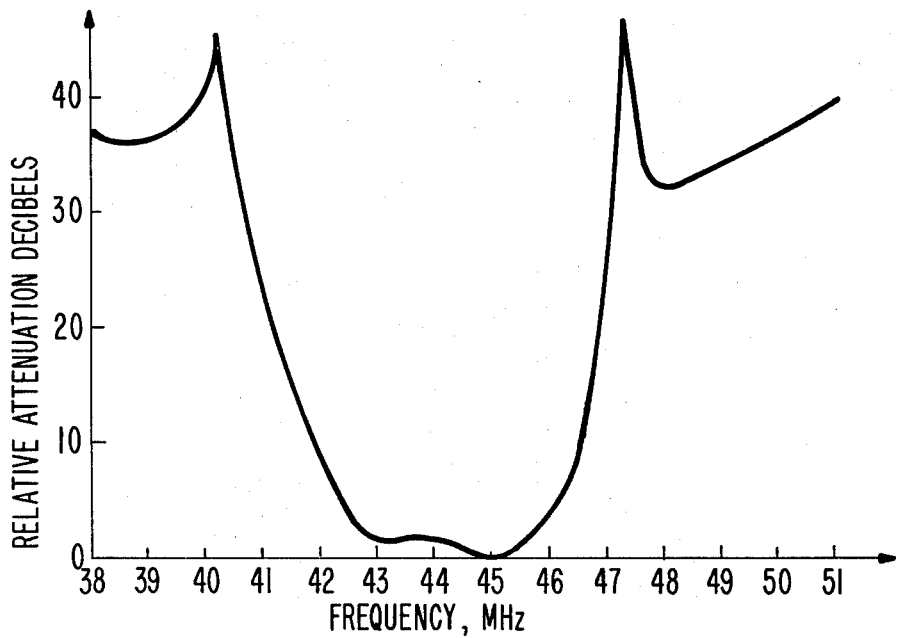
Figure 2B:
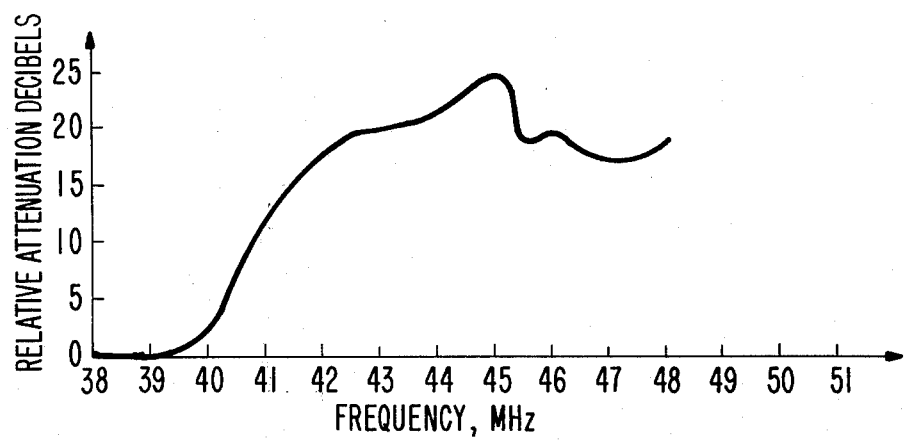
Figure 2C:
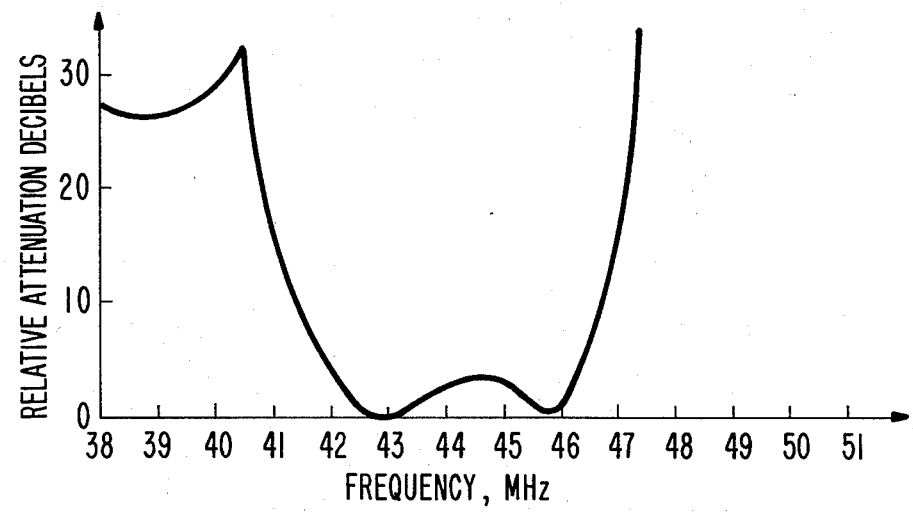

With reference to FIG. 2D, it can be seen that a peak response at about 45.5 megahertz is produced providing a desired response to the discriminator input (inductor 30) of the AFT amplifier 24. It will be appreciated that the response of the AFT circuitry is relatively undisturbed by the circuitry provided for producing the aforementioned sound response.

Hence, it can be seen that circuitry for providing both a desired sound response and a desired AFT signal may be realized by the combination of two parallel resonant circuits advantageously arranged in the manner shown.

What is claimed is:

1. In a television receiver receptive to composite video signals including modulated sound and picture carrier components and having an intercarrier intermediate frequency amplifier for amplifying both sound and picture component signals, said amplifier having a bandwidth suitable for passing said modulated sound and picture carrier components, apparatus providing a desired response to said sound and picture carrier components and providing an automatic fine tuning voltage comprising:
   amplifier means for receiving intermediate frequency signals including modulated audio and video carrier components;
   discriminator means including a first resonant circuit having a resonance at a frequency substantially equal to said picture carrier frequency and receptive to signals provided by said amplifier means for providing automatic fine tuning signals responsive to picture carrier frequency deviation from said resonant frequency; and
   a second resonant circuit interposed in series between said amplifier means and said discriminator means having a resonance at a frequency lower than said sound carrier frequency for providing a greater impedance loading upon said amplifier means at frequencies away from said resonance than near said resonance, said impedance loading causing said amplifier means to provide a lower gain for signals removed from said resonance than for those close to said resonance.

2. Apparatus according to claim 1 wherein said first resonant circuit is comprised of a parallel combination of inductor and capacitor arranged in shunt with the path of signals from said amplifier means.

3. Apparatus according to claim 2 wherein said second resonant circuit is comprised of a parallel combination of inductor and capacitor arranged in series between said amplifier means and said first resonant circuit.

4. Apparatus according to claim 2 wherein said discriminator means includes a discriminator transformer having a primary winding comprised of said inductor in said first resonant circuit.

5. Apparatus according to claim 4 wherein said discriminator means further includes a differential amplifier having input terminals coupled to a secondary winding of said discriminator transformer.

6. Apparatus according to claim 5 wherein said first resonant circuit has a resonance at about 45.75 MHz and said second resonant circuit has a resonance at about 37 MHz.

* * * * *